INVENTORS.
ALLAN L. FLANAGAN, WILLIS F. HICKES
BY David E. Hoppe

ATTORNEY

United States Patent Office 3,527,984
Patented Sept. 8, 1970

3,527,984
ENERGY BARRIER LIMITING TRANSFER OF
ENERGY FROM ONE AREA TO ANOTHER
Allan L. Flanagan, Attleboro, and Willis, F. Hickes,
Sharon, Mass., assignors to The Foxboro Company,
Foxboro, Mass., a corporation of Massachusetts
Filed Dec. 1, 1967, Ser. No. 687,348
Int. Cl. H02j
U.S. Cl. 317—9                                        9 Claims

ABSTRACT OF THE DISCLOSURE

A resistance network in combination with an impedance matching amplifier is employed to isolate an input circuit from an output circuit; with the termination of the input circuit or output circuit located in a hazardous area, the maximum energy that can be transferred to the hazardous area under adverse conditions is thereby limited to a safe level; an additional feature is the use of a self-limiting power supply associated with the input circuit and energizing a device in the hazardous area; the combination permits safely monitoring a field sensing device in a hazardous area and safely furnishing control command to a related valve operator in the hazardous area.

Combustible gases, vapours or dusts are used in connection with certain processes and in such cases there is a requirement that certain process locations, where instrumentation is necessary, employ devices incapable of igniting such materials, for example intrinsically safe devices. Intrinsically safe instrumentation employing electrical signals must have circuit configuration and device design so that under any possible condition of operation or of malfunction there will be a limited level of energy transfer to the hazardous area. For example, if the hazardous area contains hydrogen, the maximum energy transfer to the area under any conditions must be severely limited. It has been found that under certain conditions 30 micro-joules of energy in the form of a spark ignites hydrogen. For the more common, less readily ignited materials, $\frac{1}{10}$ of a milli-joule energy is a more representative limiting figure. These energy values are representative only and vary widely with circuit parameters. Safety of a specific circuit is usually determined by trial of the actual device under carefully controlled conditions.

The invention directs itself to providing isolating or energy barrier means in input and output circuits associated with instrumentation in a hazardous area, which area is strictly limited in the permissible amount of energy transfer thereto. The isolating circuit of the invention may be employed in connection with a field measuring device and also in connection with a device in the hazardous area to be actuated by suitable control.

In the applications for which the present invention is suitable, a passive barrier would not be adequate. It is a specification that the energy barrier work from a low level signal source to deliver up to 50 milliamperes with a 300 ohm load. Accordingly, an active barrier design is required to perform to this specification. A passive barrier would require a high level of power input to supply the necessary output.

Briefly stated, the basic energy barrier of the invention employs a resistive network at the input of a high impedance amplifier, the network consisting of two resistances each in series with an input terminal of the amplifier, with a resistance of low impedance connected serially with the aforesaid two resistances to thereby complete a serial input circuit to the amplifier. The amplifier input signal appears across the resistance of low value.

These and other advantages of the invention will be in part apparent from the specification below and in part from the figures in which.

Figure 1:
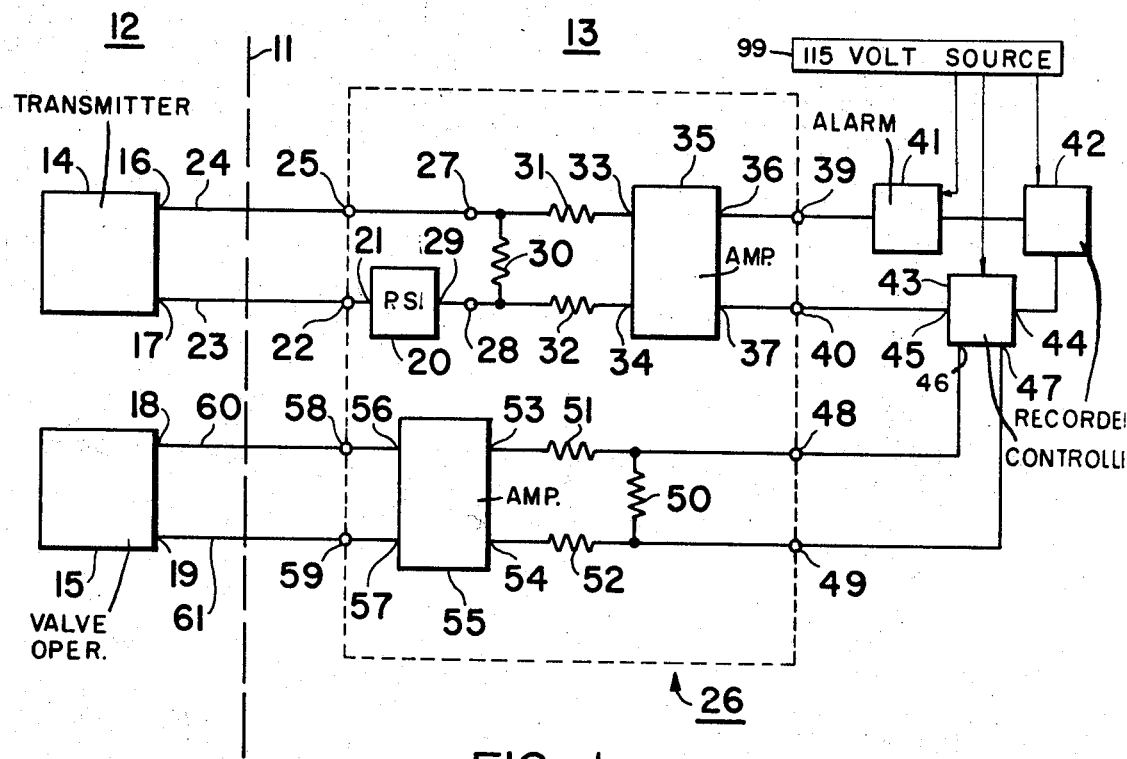
FIG. 1 is a diagram, partially schematic and partially in block diagram form illustrating the apparatus employed in a control system.

Referring to FIG. 1, line 11 symbolically separates an area 12 which is located in the field from a general area 13 containing process instrumentation. Any instrumentation or other equipment in area 12 is required to be safe by means such as are intrinsically safe, and energy transfer to area 12 from associated instrumentation is illustratively limited to $\frac{1}{10}$ milli-joule. Located in the field is transmitter 14, illustratively for transmitting the magnitude of a process condition such as pressure, temperature, flow, or the like. Also located in area 12 is a valve operator 15 for actuating a process valve, which valve actuator 15 is illustratively designed to be operated by a control current of from 10–50 milliamps, this range of control current being a standard process control range.

Transmitter 14 is illustratively serially connected into a signal circuit having a current range of from 10–50 milliamps, the particular current level indicating the magnitude of the sensed measurement. Power supply 20 supplies current from the signal circuit of which transmitter 14 is a part. Illustratively, terminal 21 of power supply 20 is positive, and conventional current flows from terminal 21 through barrier connection 22 along connector 23 connecting to the field at terminal 17 of transmitter 14; the return current passes from terminal 16 of transmitter 14 along connector 24 to terminal 25 of barrier 26; thence current flows through terminal 27 resistance 30, terminal 28 back to terminal 29 of power supply 20 thereby completing the serial circuit of the input signal. Thus, transmitter 14 determines, in accordance with the sensed measurement, the level of current flowing through resistance 30, the current being in the range of 10–50 milliamps according to the magnitude of the sensed condition. Resistance 30 is of relatively low value, illustratively 100 ohms.

The input circuit described is connected to the input of amplifier 35 by resistances 31 and 32. Resistance 31 is connected from the end of resistor 30 associated with terminal 27 to input terminal 33 of amplifier 35; resistance 32 is connected from the end of resistance 30 associated with terminal 28 to input 34 of amplifier 35. Resistances 31 and 32 are both illustratively 10,000 ohms, this value being determined as sufficiently high to provide the requisite energy isolation between the instruments at the panel energized by amplifier 35 and the input circuit associated with transmitter 14.

Amplifier 35 is another current signal source having a standard range of 10–50 milliamps to indicate the magnitude of input signal corresponding thereto. Outputs 36 and 37 of amplifier 35 are connected through terminals 39 and 40 respectively of barrier 26, terminals 39 and 40 being connected for example to a serial configuration of an alarm 41, a recorder 42, and a controller 43. In the case of the controller 43, terminals 44 and 45 thereof are in the serial circuit in the output of amplifier 35. Alarm 41, recorder 42 and controller 43 are operated from a 115–120 volt power source 99. With this level of power associated with the devices, it is possible that 120 volts may be applied to the output circuit of amplifier 35 and transferred therethrough to its input circuit. Illustratively, 120 volts may be applied between output terminals 36 and 37 of amplifier 35, or from either terminal 36 or terminal 37 to ground. Should this occur, the serial circuit consisting of resistances 31, 30, and 32 connected between differential amplifier inputs 33 and 34 limits the maximum energy transfer therethrough to resistance 30 and the associated transmitter 14 circuit to a safe level.

In connection with this, power supply 20 has a maximum of 70 volts associated therewith, and under the most adverse conditions will transfer a maximum energy level to the transmitter 14 circuit below the specified limit.

Controller 43 has control outputs 46 and 47 for furnishing a control signal in the range of 10–50 milliamps through terminals 48 and 49 of barrier 26 through a low resistance 50, illustratively two hundred ohms. From either end of resistance 50 is connected resistance 51 and 52 respectively connected to input 53 and 54 of amplifier 55. Each resistance 51 and 52 is illustratively 10,000 ohms. The output of amplifier 55 is the corresponding current in the range of 10–50 milliamps for operating valve operator 15, the output circuit being between terminal 56 of amplifier 55, terminal 58 of barrier 26, and connector 60 going to terminal 18 of operator 15; the return path is from terminal 19 of operator 15, connector 61 to terminal 59 of barrier 26 and back to terminal 57 of amplifier 55.

With this configuration the maximum energy that may be transferred from controller 43 through amplifier 55 to the field is limited to a level that has been judged acceptable by tests.

Figure 2:
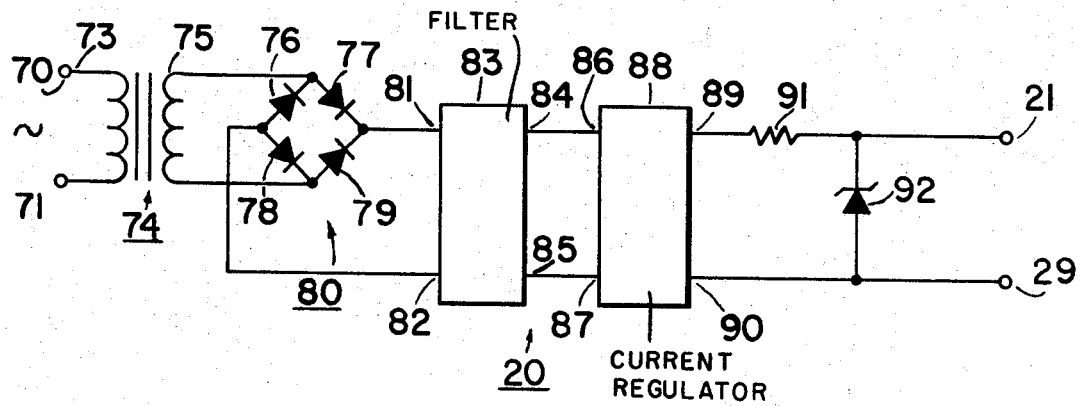
FIG. 2 is a diagram, partially block and partially schematic illustrating a power supply to be employed in conjunction with the invention.

To further insure limitation of energy transfer that may arise from a malfunction or abnormal condition associated with power supply 20, a special design may be incorporated therein such as illustrated in FIG. 2. A source of A.C. power is supplied to terminals 70 and 71 of primary 73 of transformer 74. Secondary 75 is coupled to a bridge rectifier employing four diodes 76, 77, 78 and 79, the bridge being designated by numeral 80. The bridge output is connected to channel input terminals 81 and 82 of a filter 83. Filter 83 may be a conventional type of power supply filter, but preferably a filter that does not employ an inductive choke, in order to eliminate any possible inductive energy kick. Output 84–85 of filter 83 is coupled to input terminals 86 and 87 of a constant current regulator 88, which may be of any one of the designs available for a constant current source. Output 89–90 of consequent regulator 88 may be regulated to illustratively 55 milliamps, this output being passed through a serial configuration of resistance 91 and Zener diode 92. Zener diode illustratively regulates voltage drop across of 45 volts D.C. Output terminals 21 and 29 of power supply 20 are then taken from across Zener diode 92. Employing such a configuration of power supply 20 in the circuit illustrated in FIG. 1, the maximum energy that may be available to terminals 21 and 29 under any circumstances is limited to any energy derived from a combination of 55 milliamps and 45 volts. That is in the event of failure of resistance 91 or Zener 92, either 55 milliamps will be the maximum current, or 45 volts D.C. will be the maximum voltage furnished by power supply 20 to the circuit including transmitter 14 in hazardous area 12.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. Active energy barrier apparatus for limiting the transfer of energy from an area not required to be intrinsically safe to an area required to be intrinsically safe comprising, means for amplifying a signal representative of a process parameter having an input circuit and an output circuit with said input circuit including a serial configuration of impedances interconnecting input terminals of said means for amplifying, said serial configuration including at least a pair of higher valued impedances each interconnected at a respective said input terminal of said means for amplifying and a lower valued impedance completing a serial circuit including said high valued impedances and said input terminals to thereby form said serial configuration of impedances, with said lower valued impedance being the primary load for said input signal,
whereby energy transfer between said input circuit and said output circuit is limited by said serial configuration of impedances so that either said input circuit or said output circuit of said means for amplifying may be interconnected with instrumentation required to be intrinsically safe.

2. The active energy barrier apparatus of claim 1, wherein the limitation on energy transfer is primarily determined by the values of said higher valued impedances.

3. The active energy barrier apparatus of claim 1, wherein the values of said higher valued impedances are in the order of thousands of ohms and the value of said lower valued impedance is in the order of hundreds of ohms.

4. The active energy barrier apparatus of claim 1, wherein said signal is a range of D.C. current levels representative of said process parameters.

5. The active energy barrier apparatus of claim 4, wherein said range of current values is from 10–50 milliamperes D.C.

6. The active energy barrier apparatus of claim 1, employed in a process with a first embodiment of said active energy barrier having an input circuit responsive to a process measurement and an output circuit interconnected with process control means, and with a second embodiment having an input circuit interconnected with said process control means and an output circuit interconnected with a process control actuating means with both the process measurement instrumentation and the process actuating instrumentation being in an area required to be intrinsically safe, and with said process controller being located in an area not required to be intrinsically safe.

7. The combination of claim 6, wherein said process measuring instrumentation requires an external power supply, which power supply is located in an area not required to be intrinsically safe, with said power supply being included in said input circuit responsive to said process actuating instrumentation being in an area restructed that the maximum energy that may be supplied therefrom under any condition is in the order of its normal working energy output.

8. The active energy barrier apparatus of claim 1 in an application wherein said process controller has an external power supply of 120 volts A.C.

9. The active energy barrier apparatus of claim 5, wherein the output circuit of said embodiment responsive to said process measurement includes a process controller and either alarm or recording instrumentation, all of which are supplied with 120 volts A.C.

References Cited

UNITED STATES PATENTS

| 3,080,509 | 3/1963 | Rowe | 317—149 |
| 3,193,710 | 7/1965 | Elliot | 307—136 |
| 3,309,542 | 3/1967 | Elliot | 307—136 |

LEE T. HIX, Primary Examiner

U.S. Cl. X.R.

307—92, 149; 317—262; 330—185